(12) United States Patent
Carey Stachowski et al.

(10) Patent No.: US 9,765,216 B2
(45) Date of Patent: Sep. 19, 2017

(54) DRY ADHESIVE

(75) Inventors: Barbara Carey Stachowski, Orinda, CA (US); Loc Vinh Bui, Moorpark, CA (US); Joanne Moody, Livermore, CA (US)

(73) Assignee: Carey & Co., Orinda, CA (US)

( * ) Notice: Subject to any disclaimer, the term of this patent is extended or adjusted under 35 U.S.C. 154(b) by 851 days.

(21) Appl. No.: 13/403,665

(22) Filed: Feb. 23, 2012

(65) Prior Publication Data

US 2012/0216949 A1 Aug. 30, 2012

Related U.S. Application Data

(60) Provisional application No. 61/446,633, filed on Feb. 25, 2011.

(51) Int. Cl.
| | |
|---|---|
| B32B 3/30 | (2006.01) |
| C08L 75/04 | (2006.01) |
| C08J 5/12 | (2006.01) |
| C09J 5/00 | (2006.01) |

(52) U.S. Cl.
CPC .......... C08L 75/04 (2013.01); C08J 5/12 (2013.01); C09J 5/00 (2013.01); *C08J 2375/04* (2013.01); *C08J 2383/04* (2013.01); *C09J 2475/006* (2013.01); *C09J 2483/006* (2013.01); *Y10T 24/10* (2015.01); *Y10T 24/153* (2015.01); *Y10T 24/33* (2015.01); *Y10T 428/249953* (2015.04)

(58) Field of Classification Search
CPC ...... C08J 2375/04; C08J 2383/04; C08J 5/12; C08L 75/04; C09J 2475/006; C09J 2483/006; C09J 5/00; Y10T 24/10; Y10T 24/153; Y10T 24/33

USPC .......... 428/410, 400, 420, 430, 440
See application file for complete search history.

(56) References Cited

U.S. PATENT DOCUMENTS

| | | | | |
|---|---|---|---|---|
| 4,643,944 A | * | 2/1987 | Agethen et al. | 428/349 |
| 5,005,264 A | * | 4/1991 | Breen | 24/30.5 R |
| 5,302,440 A | * | 4/1994 | Davis | 428/196 |
| 5,322,727 A | | 6/1994 | Yankus et al. | |
| 5,382,239 A | * | 1/1995 | Orr et al. | 604/177 |
| 5,384,384 A | | 1/1995 | Inoue et al. | |
| 5,657,516 A | * | 8/1997 | Berg | A44B 18/0053 24/306 |

(Continued)

FOREIGN PATENT DOCUMENTS

| | | | |
|---|---|---|---|
| JP | 2006-504842 | * | 12/2006 |
| WO | WO 2007-149656 | * | 12/2007 |

OTHER PUBLICATIONS

Machine translation of JP 2006-504842, retrieved May 3, 2016.*
Smooth-on NPL document, retrieved May 3, 2016.*

*Primary Examiner* — Michael B Nelson
(74) *Attorney, Agent, or Firm* — Haverstock & Owens LLP

(57) ABSTRACT

A selective adhesive mechanism comprises an engineered surface structure or substrate and a compliant member. The compliant member is able to be a dry and non-tacky substance. The compliant member is selectively adhesive to the engineered surface when the compliant member is in contact with the engineered surface. The compliant member shows adhesion to the engineered surface when the compliant member is within a pre-selected range of hardness. In some embodiments, the compliant member comprises a polymeric member, a thermoplastic elastomer, silicone, polyurethane, or a combination thereof.

26 Claims, 5 Drawing Sheets

(56) References Cited

U.S. PATENT DOCUMENTS

| | | |
|---|---|---|
| 6,299,596 B1 | 10/2001 | Ding |
| 6,743,515 B1 | 6/2004 | Achenbach et al. |
| 6,884,833 B2 | 4/2005 | Chheang et al. |
| 2004/0249089 A1 | 12/2004 | Yeung |
| 2008/0008849 A1 | 1/2008 | Mazurek et al. |
| 2008/0167416 A1* | 7/2008 | Debroy et al. ............... 524/494 |
| 2010/0183251 A1* | 7/2010 | Neltner .............. B65D 33/2541 383/210.1 |
| 2010/0204667 A1 | 8/2010 | Chakravarthy |
| 2010/0210794 A1 | 8/2010 | Frese et al. |

* cited by examiner

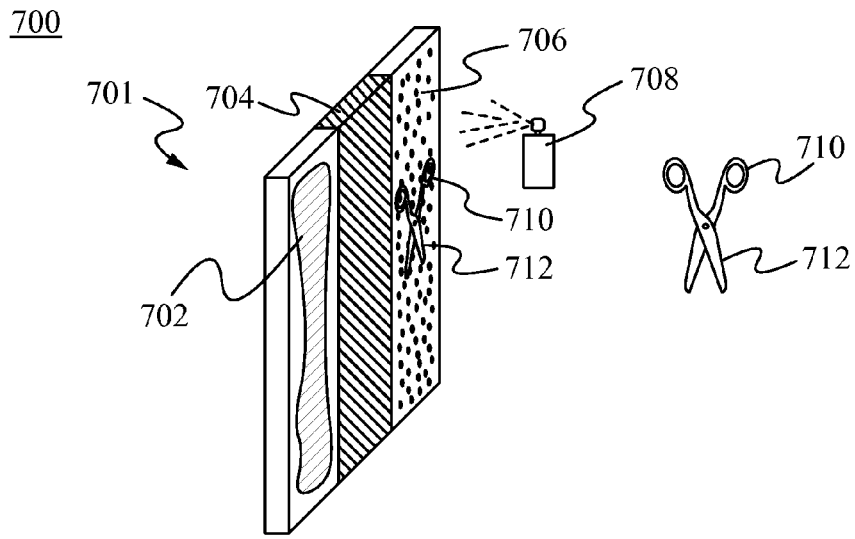
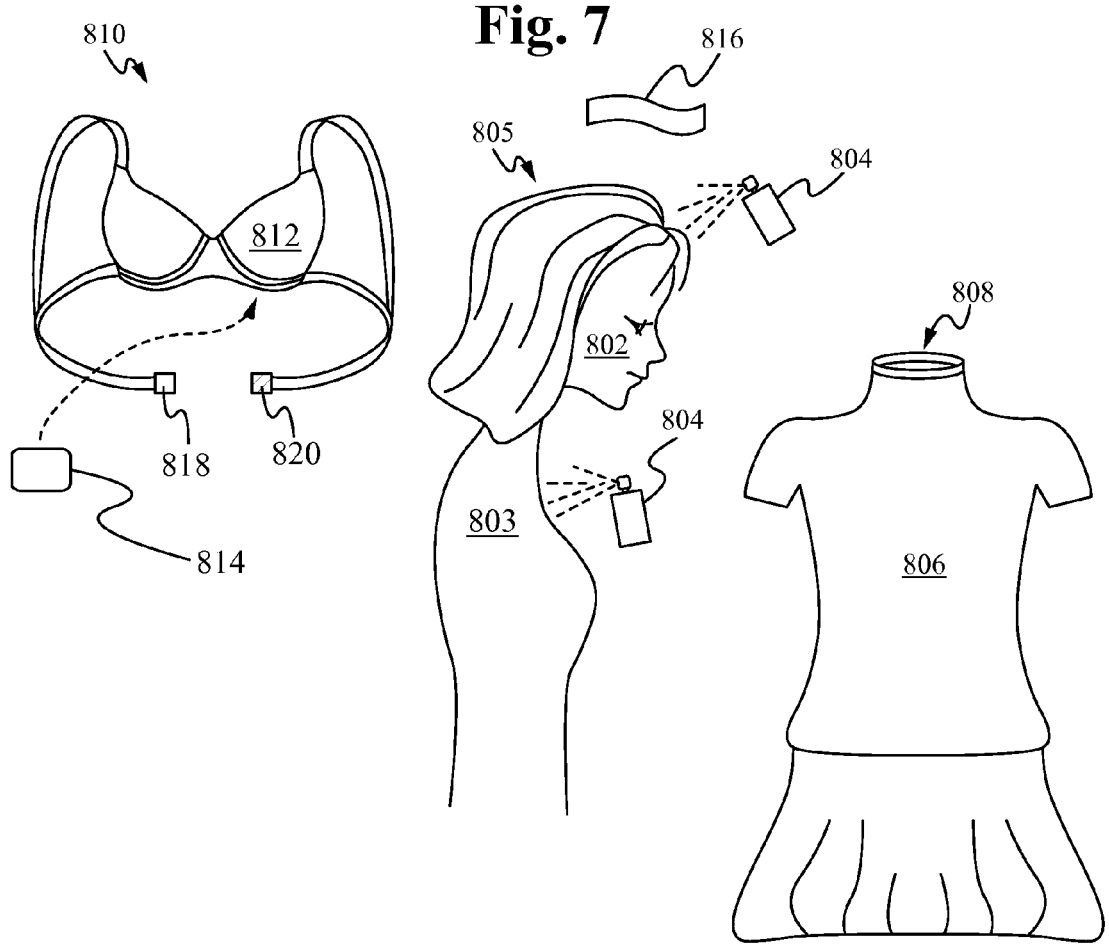
Fig. 7
Fig. 8

DRY ADHESIVE

CROSS-REFERENCE TO RELATED APPLICATIONS

This application claims priority from U.S. Provisional Patent Application Ser. No. 61/446,633, filed Feb. 25, 2011 and entitled "DRY ADHESIVE," which is hereby incorporated herein by reference in its entirety for all purposes.

FIELD OF THE INVENTION

The present invention relates to adhesives. More specifically, the present invention relates to surface specific adhesives.

BACKGROUND OF THE INVENTION

Typical adhesives generally are liquid or semi-liquid that bond similar or dissimilar materials together by curing through evaporation of solvents and/or chemical reaction of one or more constituents. While liquid or semi-liquid adhesives are useful in many joining applications, a disadvantage of liquid or semi-liquid adhesives is that it takes a long time to cure the adhesives, i.e., the joining step is not immediate. Furthermore, liquid or semi-liquid adhesives often give off volatile organic compounds (VOC) that are toxic, have limited pot life, and/or have limited shelf life. Liquid adhesives are difficult to apply in a uniform manner, often showing shrinkage. From a process and application viewpoint, heat and pressure, jigs and fixtures for the joint geometry, rigid process control, inspections, and training are often required. Other issues include variable viscosity, evaporation, and/or substrate contamination.

Various typical dry adhesives have been developed to overcome the disadvantages of liquid adhesives. For example, pressure sensitive adhesive (PSA) single-coated tape products are examples of dry adhesive products consisting of a backing material, primer, adhesive, and release agent or liner. In general, pressure sensitive adhesive products require the adhesive to be tacky and easily deformable, i.e., soft, for adhesion to another surface, i.e. adherend. There are other adhesion considerations such as PSA chemistry, surface tension, and surface preparation that are considered to appropriately matching of PSA to various substances. The negative issues associated with PSAs include dwell time to gain full adhesive strength while under pressure, mismatch of surfaces, surface preparation time, lower adhesive strength, and limited shelf and working life.

Other typical dry adhesive products are hot melt adhesive products. Hot melt adhesive products are typically thermoplastic copolymers tackified with resins. Hot melt adhesive products have limited use because high temperature is required to melt the adhesive to join the desired surfaces. The hot melt adhesive is typically heated above its melting point to a molten state and rapidly solidifies to form the bond between the desired surfaces. There are many disadvantages to hot melt adhesives including potential injury to persons applying the adhesive, time to heat the adhesive, heat damage to the substrate, and limited range of properties.

Although Velcro® is a mechanical fastener using hook-and-loop and is not an adhesive, Velcro® is employed as a dry fastener to join together similar and/or dissimilar surfaces. Velcro® typically consists of two layers. A first layer consists of a first backing covered with tiny hooks, and a second layer consists of a second backing covered with tiny loops. When the hook side is pressed together with the loop side, the loops catch the hooks and hold the first backing together with the second backing. However, Velcro® is able to accumulate hair, dust, and fiber in the hooks and reduce the efficiency of the fastener. Further, Velcro's® hooks are able to easily grab onto woven items such as a sweater and are able to cause damage to the item upon removal.

SUMMARY OF THE INVENTION

A selective adhesive mechanism is able to comprise an engineered surface and a compliant member. The compliant member is able to be dry and a non-tacky substance. The compliant member is able to be selectively adhered to the engineered surface when the compliant member is in contact with the engineered surface.

In a first aspect, an adhesive mechanism comprises a first member having an engineered surface and a second member comprising a compliant member to be selectively adhered to the engineered surface selectively. The compliant member is able to form an adhesive bond with the engineered surface when the compliant member and the engineered surface are brought into physical contact. The compliant member is able to comprise a polymeric member. The polymeric member is able to comprise a silicone polymer and a silicon based polymer. The silicone polymer is able to comprise a silicone gel or silicone rubber. The polymeric member is able to comprise a thermoplastic elastomer. The polymeric material is able to comprise a dry, non-tacky, or a combination thereof substance before coming in contact with the engineered surface. The selective adhesive is able to result from mechanical interlocking between the engineered surface and the polymeric material. Further, the selective adhesive is able to be complemented by intermolecular forces. The intermolecular forces are able to comprise a hydrogen bond, van der Waals force, other adhesive forces, or a combination thereof.

In a second aspect, a method of forming an adhesive mechanism comprises preparing a first dry material and a second material and detaching the first dry material from the second material, wherein the first dry material is capable of being instantly removable from the second material without substantial damage to the first dry material. The adhesive property of the first dry material is able to be surface selective, such that the first dry material is able to be adhesive to the second material selectively. The first dry material is able to comprise silicone. The method is able to further comprise applying the first material to a device, such that the first dry material forms an immediate attachable and detachable, repositionable mechanism on the device. The term "immediate" used herein is able to include the meaning of instant, close in time, and proximate, such as less than two seconds.

In a third aspect, a set of adhesive material comprises a first surface containing a silicone rubber and a second surface containing a chemical substance that is selectively adhered to the silicone rubber. The silicone rubber is able to be molded to attach with a device or enclose the device. The device is able to comprise one or more hand tool, electronic device, equipment, office supply, kitchen ware, decoration, or a combination thereof. A person of ordinary skill in the art will appreciate that any devices are applicable so long as it is physically tangible. The second surface is able to comprise one or more wall, paper, medical device, electronic device, or a combination thereof.

In a fourth aspect, a method of using an adhesive material comprises coupling a device containing a compliant member to an engineered surface by forming an area of selective adhesion force between the compliant member and the engineered surface when the compliant member physically in contact with the engineered surface and decoupling the device from the engineered surface by gradually reducing the adhesion force between the compliant member and the engineered surface. The compliant member is able to comprise silicone polymer or polyurethane.

In a fifth aspect, a polymer containing member comprises a polymeric material having selective adhesion to a surface when the hardness of the polymeric material is within a preselected range of Shore A scale of a durometer. The range is able to be lower than 42 Shore A hardness, such as between 42 and 0, when the polymeric material comprises silicone rubber. The range is able to be lower than 55 Shore A hardness, such as between 55 and 0, when the polymeric material comprises polyurethane.

In a sixth aspect, a coated member comprises pores capable of forming selective bonding with a polymeric substance. The pores are able to have sizes capable of fitting a portion of the polymeric substance, so that the selective bonding is formed. The bonding is able to be formed when the polymeric substance is within a pre-selected hardness. The range is able to be lower than 42 Shore A hardness when the polymeric material comprises silicone rubber. The range is able to be lower than 55 Shore A hardness when the polymeric material comprises polyurethane.

In a seventh aspect, a fastening device comprises a first surface containing a polymeric material and a second surface containing an engineered surface, wherein the fastening device is able to fasten an object when the first surface is in physical contact with the second surface. The fastening device is able to comprise a twist tie.

The above summary relates to some of the embodiments of the present invention and is not intended to limit the scope of the invention, which is set forth in the claims herein. These and other features of the present invention will be described in more detail below, in the detailed description of the invention, and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 shows more uses of the surface specific polymeric dry adhesive in accordance with some embodiments of the present invention.

FIG. 8 shows more uses of the surface specific polymeric dry adhesive in accordance with some embodiments of the present invention.

DETAILED DESCRIPTION OF THE PREFERRED EMBODIMENT

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention is able to be practiced without some or all of these specific details. In other instances, well known process steps and/or structures have not been described in detail in order to not unnecessarily obscure the present invention.

Various embodiments are described herein below, including compositions, methods, articles of manufacturing, and techniques. Further, the invention is able to also cover apparatuses for practicing embodiments of the present invention.

The features and advantages of the invention are able to be better understood with reference to the figures and discussions that follow.

Figure 1:
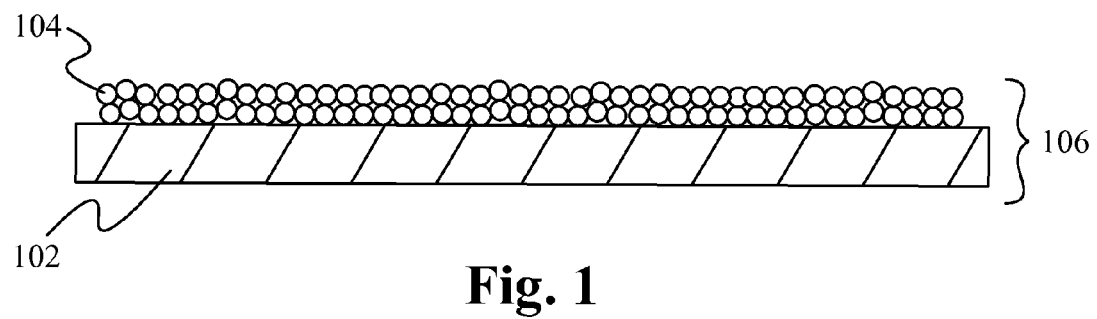
FIG. 1 shows a simplified schematic of a particulate coating in accordance with one or more embodiments of the present invention.

FIG. 1 shows a simplified schematic of a particulate coating in accordance with one or more embodiments of the present invention. As shown in the example of FIG. 1, first surface 102 is able to be coated with particulate coating 104 to form an engineered surface 106. In some embodiments, the first surface 102 comprises a porous surface. Non-limiting examples of the porous surfaces comprise paper, corrugated box, masonry, drywall, wood, ceramics, woven and non-woven (many examples including diapers) substrates. In other embodiments, the first surface 102 comprises a non-porous surface. Non-limiting examples of the non-porous surfaces comprise plastic, rubber, metal, and glass.

In some embodiments, the particulate coating 104 is able to be configured to adhere on the first surface 102. The particulate coating 104 is able to be applied to the first surface 102 as a liquid coating. The liquid coating is able to comprise submicron particles of fumed silica and/or fumed alumina. The size of the aggregate submicron particles is able to be in the range of about 0.2 to 0.3 microns. The submicron particles are able to have surface area in the range of about 50 to 400 $m^2/g$. A person of ordinary skill in the art would appreciate that the liquid coating is able to contain particles in any sizes (such as micrometer, nanometer, and picometer) and having any corresponding surface area.

Examples of the aforementioned fumed silica or fumed alumina are able to be CAB-O-SPERSE®, CAB-O-SIL®, and SPECTRAL™ manufactured by CABOT™.

The particle(s) or a mixture thereof are able to be present in a liquid coating composition in the range of half of a percent (0.5%) to about fifty percent (50%) by weight, more preferably in the range of about one percent (1.0%) to about forty percent (40%) by weight, and even more preferably in the range of about two percent (2.0%) to about thirty percent (30%) by weight. A person of ordinary skill in the art would appreciate that any weight percentage of the particles in the liquid is applicable. For example, the effective concentration of the particle(s) is able to depend on the percentage by weight of the particle(s) required in the liquid coating composition to produce the desired surface properties.

The liquid coating is able to comprise at least a binder. The binder is able to be a polymer employed to keep the particles adhered to each other and to the first surface 102. In some examples, the liquid coating comprises one polymer if the polymer is able to effectively act as a binder to keep the particles adhering to each other and to the first substrate 102. In another example, the liquid coating comprises two polymers, wherein a first polymer is able to be employed to keep the particles adhered to each other while a second polymer is able to be employed to adhere the particles to the first surface 102. In yet another example, the liquid coating comprises a plurality of polymers, wherein a first polymer is able to be employed to keep the particles adhered to each other, a second polymer is able to be employed to adhere the particles to the first surface 102, and a third polymer is able to be employed to adjust the viscosity of the coating. Thus, the liquid coating is able to comprise at least one polymer to achieve the desired end properties of the coating. However, a plurality of polymers is able to be employed to achieve the desired end properties of the coating.

Examples of suitable water-soluble and water-dispersible polymers are able to be included in the liquid coating compositions of the present invention include, but are not limited to, acrylic, polyvinyl alcohols, polyvinyl pyrrolidone, polyester emulsion, styrene maleic anhydride, cellulose acetate resins, and derivatives thereof. Analogously, suitable solvent-soluble resins with water tolerance are able to include, but are not limited to, acrylic, cellulose acetate, polyketone, polyvinyl alcohol, phenolic, novolac resins, and derivatives thereof.

Examples of the aforementioned resins or polymers are able to be Joncryl® manufactured by S.C. Johnson, PVP manufactured by Air Products™, MOWIOL® manufactured by Kurary™, and Synthetic Resin DS manufactured by Degussa™.

The polymer(s) or a mixture thereof is able to be present in a liquid coating composition in the range of half of a percent (0.5%) to about thirty percent (30%) by weight, more preferably in the range of about one percent (1.0%) to about two percent (20%) by weight, and even more preferably in the range of about five percent (5.0%) to about fifteen percent (15%) by weight. A person of ordinary skill in the art would appreciate that any weight percentage of the polymer(s) or a mixture thereof in the liquid is applicable. For example, the effective concentration of the polymer(s) is able to depend on the percentage by weight of the polymer(s) required in the liquid coating composition to produce the desired binder and/or viscous properties.

The liquid coating is able to comprise surfactants. In some embodiments, the surfactants are employed to modify the surface tension of the liquid coating to improve wetting of the coating on the first surface 102. Surfactants suitable for use in the various coating compositions of the present invention are able to comprise ionic, zwitterionic (amphoteric), and/or non-ionic surfactants. Surfactants are surface active agents that contain both hydrophobic groups and hydrophilic groups. Surfactants are generally able to be characterized by the presence of a charge on the hydrophilic group of the molecule. For example, non-ionic surfactants are able to have no charge on the hydrophilic portion of the molecule; whereas, ionic surfactants are able to have a net charge on the hydrophilic portion of the molecule. Negatively charged surfactants are called anionic surfactants, whereas, positively charged surfactants are called cationic surfactants. Furthermore, surfactants with two oppositely charged groups on the hydrophilic portion of the molecule are called zwitterionic surfactants. More generally, surfactants are able to be hydrocarbon-based surfactants, silicone-based surfactants, or fluorosurfactants.

Examples of the suitable hydrocarbon-based surfactants are able to include, but are not limited to, acetylenic-based surfactants. For example, acetylenic surfactants that are available from Air Products™ suitable for use in coating compositions such as Dynol™ 604, Dynol™ 607, Surfynol® 104, Surfynol® 104A, Surfynol® 104BC, Surfynol® 104DPM, Surfynol® 104E, Surfynol® 104H, Surfynol® 104NP, Surfynol® 104PA, Surfynol® 104PG50, Surfynol® 104S, Surfynol® 2502, Surfynol® 420, Surfynol® 440, Surfynol® 465, Surfynol® 485, Surfynol® 485W, Surfynol® 502, Surfynol® 61, Surfynol® SE, Surfynol® SE-F, and Surfynol® TG-E. In some embodiments, the suitable non-ionic surfactants are available from Air Products™ including Carbowet® 106 and Carbowet® 109.

Examples of the suitable silicone-based surfactants include, but are not limited to, CoatOSil® 1211, CoatOSil® 2400, CoatOSil® 2810, CoatOSil® 2812, CoatOSil® 2815, CoatOSil® 3500, CoatOSil® 3501, CoatOSil® 3503, CoatOSil® 3505, CoatOSil® 3509, CoatOSil® 3573, Silwet® L-77, Silwet® L-7001, Silwet® L-7200, Silwet® L-7210, Silwet® L-7220, Silwet® L-7230, Silwet® L-7280, Silwet® L-7500, Silwet® L-7510, Silwet® L-7550, Silwet® L-7600, Silwet® L-7602, Silwet® L-7604, Silwet® L-7605, Silwet® L-7607, Silwet® L-7608, Silwet® L-7650, and Silwet® L-8610. The CoatOSil® and Silwet® surfactants are available from Crompton Corp. (Union Carbide™ or OSi Specialties™).

Examples of the suitable fluorosurfactants include, but are not limited to, Zonyl® FSP, Zonyl® FSO, Zonyl® FSA, Zonyl® FSN-100, Zonyl® FSO-100, and Zonyl® FSG. Zonyl® surfactants are available from DuPont™.

The surfactant(s) or a mixture thereof that are contained in a coating composition is able to be in the range of five hundredths of one percent (0.05%) to about three percent (3%) by weight, more preferably in the range of about seventy-five thousandths of one percent (0.075%) to about two percent (2%) by weight, and even more preferably in the range of about one tenth of one percent (0.1%) to about one-and-a-half percent (1.5%) by weight. A person of ordinary skill in the art would appreciate that any percentage of the surfactant(s) or a mixture thereof in the coating composition is applicable. The effective concentration of the surfactant(s) is able to depend on the percentage by weight of the surfactant required in the liquid coating composition to produce the desired surface tension and wetting properties.

In accordance with some embodiments of the present invention, alcohols are able to be employed as the fast-drying solvent in various coating compositions to modify the drying property of the resulting coating material. Alcohols suitable for the coating compositions in accordance with some embodiments of the present invention include, but are not limited to, methanol, ethanol, isopropyl alcohol, n-propyl alcohol, tert-butanol, n-pentanol, benzyl alcohol, and derivatives thereof.

In some embodiments, methanol is added to the coating composition to increase the drying rate. In some embodiments, benzyl alcohol is added to slow down the drying rate of a coating composition. An effective concentration of alcohol is able to be empirically determined based on the applications, so that desired drying rates to specific applications are able to be attained.

In some embodiments, an alcohol and/or a mixture of alcohols are able to be in the range of about one percent (1%)

to about seventy-five percent (75%) by weight, more preferably in the range of about five percent (5%) to about fifty percent (50%) by weight, and even more preferably in the range of about eight percent (8%) to about forty percent (40%) by weight. In some embodiments, the alcohol is able to be added individually and/or as a mixture of different alcohols in an effective concentration to achieve desired properties. A person of ordinary skill in the art would appreciate that the term "desired property" described herein comprises desired properties at any stage of the manufacturing process, such as before, during, and post manufacturing process.

In some other embodiments, glycol ethers and/or esters are able to be employed as the fast-drying solvent in various coating compositions to modify the drying property of the resulting coating.

The suitable glycol ethers employed in various coating compositions in accordance with some embodiments of the present invention include, but are not limited to, propylene glycol methyl ether ("glycol ether PM" or "GEPM"), dipropylene glycol methyl ether, tripropylene glycol methyl ether, propylene glycol ethyl ether, propylene glycol normal propyl ether, dipropylene glycol normal propyl ether, dipropylene glycol normal butyl ether, dipropylene glycol normal butyl ether, tripropylene glycol normal butyl ether, dipropylene glycol tertiary butyl ether, diethylene glycol methyl ether, diethylene glycol ethyl ether, diethylene glycol butyl ether, and derivatives thereof.

In some embodiments, the esters suitable to be employed in the coating compositions include, but are not limited to, amyl acetate, iso-butyl acetate, n-butyl acetate, glycol ether DB acetate, glycol ether EB acetate, glycol ether DE acetate, glycol ether EE acetate, glycol ether EM acetate, glycol ether PM acetate, ethyl acetate, ethyl-3-ethoxy propinate, isopropyl acetate, n-propyl acetate, isobutyl isobutyrate, dibasic ester, and derivatives thereof.

In some embodiments, the glycol ethers and esters are able to be employed as co-solvents to balance various properties of a particular coating composition. In some embodiments, a relatively fast-evaporating solvent such as ethyl acetate is able to be employed to increase the drying rate of a coating composition. In some embodiments, alternatively or concurrently, a relatively slow-evaporating solvent such as glycol ether PM acetate is able to be employed to decrease the drying rate of a coating composition. In some embodiments, glycol ethers and esters are added to a coating composition in various combinations and effective percentages by weight to achieve the desired balance in properties.

In some embodiments, oxygenated solvents suitable to be employed in the coating compositions include, but are not limited to, glycol ethers such as propylene glycol n-propyl ether ("Glycol Ether PnP"), tripropylene glycol methyl ether ("Glycol Ether TPM") and/or dipropylene glycol methyl ether ("Glycol Ether DPM").

In some other embodiments, Glycol Ether PnP, Glycol Ether TPM and Glycol Ether DPM are employed in the coating compositions to offer co-solvency with a wide range of solvents and functional groups. In particular, Glycol Ether PnP, Glycol Ether TPM and Glycol Ether DPM are hydrophilic as well as having a low enthalpy of evaporation. The hydrophilic nature of the Glycol Ether PnP, Glycol Ether TPM and Glycol Ether DPM are able to provide good co-solvency with water and other solvents employed in coating compositions according to some aspects of the present invention. Further, the hydrophilic property of Glycol Ether PnP, Glycol Ether TPM and Glycol Ether DPM are able to help retard water evaporation in the bulk coating composition according to some aspects of the present invention. However, when the coating composition is atomized through the nozzles onto a substrate, the low enthalpy of evaporation property of Glycol Ether PnP, Glycol Ether TPM and Glycol Ether DPM are able to allow faster evaporation and enhance faster dying of the coating on the non-porous substrate.

In some embodiments, various mixtures of the aforementioned fast-drying solvents are able to be selected at an effective concentration in terms of percentage by weight for particular coating formulation, thereby providing desired properties.

In some embodiments, appropriate solvents are selected for a fast-drying coating to adhere on a wide range of non-porous substrates. The solvents are able to include one or more of the following features: substantial solubility with water; desirable evaporating rate; substantial miscibility with water; relatively low toxicity; relatively low viscosity; substantially complete dissolution of water-insoluble dyes; and substantially complete dissolution of resin.

In some embodiments, a fast-drying solvent and/or mixtures thereof are present in the range of about five percent (5%) to about ninety percent (90%) by weight, more preferably in the range of about ten percent (10%) to about seventy-five percent (75%) by weight, and even more preferably in the range of about ten percent (10%) to about sixty percent (60%) by weight. A person of ordinary skill in the art would appreciate that any percentages are applicable.

In some embodiments, coating compositions comprise a colorant which is able to be a dye, a pigment, or a combination thereof. Any colorants that are able to be dissolved and/or dispersed in the ink composition to achieve the targeted color and optical density are able to be used.

Examples of suitable colorants include, but are not limited to, Basonyl Blue 640 (Basic Blue 26), Basic Blue 636 (Basic Blue 7), Basonyl Violet 610 (Basic Violet 3), Basonyl Red 540 (Basic Violet 10), Basonyl Red 483 (Basic Red 1), Basonyl Red 481 (Basic Red 1:1), Basonyl Yellow 110 (Basic Yellow 2), Basonyl Yellow 105 (Basic Yellow 37), Basic Blue 47, Basic Blue 66, Basic Red 9 (Fuchsin), Basic Violet 14, Astrazone Orange G (Basic Orange 21), Auramine O (Basic Yellow 2), Basic Green 1, Basic Green 4, Chrysoidin (Basic Orange 2), Acid Black 2, Acid Black 24, Acid Black 52, Acid Black 210, Direct Black 22, Acid Blue 7, Acid Blue 9, Acid Blue 45, Acid Blue 93, Acid Blue 110, Direct Blue 86, Direct Blue 199, Reactive Blue 2, Reactive Blue 4, Acid Green 1, Acid Orange 10, Direct Orange 31, Acid Orange 7, Acid Red 1, Acid Red 14, Acid Red 52, Acid Red 87, Acid Red 92, Acid Red 94, Reactive Red 23, Reactive Red 180, Reactive Red 24, Acid Red 27, Direct Red 75, Reactive Red 4, Acid Violet 9, Acid Yellow 3, Acid Yellow 5, Acid Yellow 36, Acid Yellow 73, Acid Yellow 11, Acid Yellow 23, Acid Yellow 40, Direct Yellow 132, Reactive Yellow 2, Direct Yellow 9, Acid Black 2, Acid Black 24, Acid Black 52, Acid Black 210, Direct Black 22, Acid Blue 7, Acid Blue 9, Acid Blue 45, Acid Blue 93, Acid Blue 110, Direct Blue 86, Direct Blue 199, Reactive Blue 2, Reactive Blue 4, Acid Green 1, Acid Orange 10, Direct Orange 31, Acid Orange 7, Acid Red 1, Acid Red 14, Acid Red 52, Acid Red 87, Acid Red 92, Acid Red 94, Reactive Red 23, Reactive Red 180, Reactive Red 24, Acid Red 27, Direct Red 75, Reactive Red 4, Acid Violet 9, Acid Yellow 3, Acid Yellow 5, Acid Yellow 36, Acid Yellow 73, Acid Yellow 11, Acid Yellow 23, Acid Yellow 40, Direct Yellow 132, Reactive Yellow 2, Direct Yellow 9, Solvent Black 3, Solvent Black 5, Solvent Black 29, Solvent Blue 38, Solvent Red 24, Solvent Red 73, Solvent Red 8, Solvent Red 122, Solvent Violet 49, Solvent Yellow 79, Solvent Yellow 62, Solvent Yellow 83, Solvent Orange 41, Solvent Orange 62, Titanium Dioxide, Pigment Black 7, Pigment Blue 15:3, Pigment Blue 15:4, Pigment Red 122, Pigment Red 168, Pigment Red 170, Pigment Red 176, Pigment Red 185, Pigment Yellow 83, Pigment Yellow 120, Pigment Yellow 139, Pigment Yellow 151, Pigment Yellow 155, Pigment Yellow 180, and/or Pigment Violet 19.

In some embodiments, additives are able to be employed in various coating compositions to modify the property of the resulting coating.

For example, biocide reagents are able to be used in various coating compositions. The biocide reagents include, but are not limited to, 2-bromo-2-nitropropane-1,3-diol, 4,4-dimethyloxazolidine, 7-ethyl bicyclooxazolidine, 2,6-dimethyl-m-dioxan-4 of acetate, 1,2-benzisothiazolin-3-one, sodium o-phenylphenate, 1-(3-chloroallyl)-3,5,7-tri-aza-1-azoniaadamantane chloride, glutaraldehyde, sodium hydroxymethylglycinate, 2[(hydroxymethyl)amino]ethanol, 5-hydroxymethyl-1-aza-3, 7-dioxabicyclo(3.3.0)octane, n-methyl-2-hydroxymethyleneoxypropyl-2'-hydroxypropylamine, alkyl amine hydrochlorides, tetrahydro-3,5-dimethyl-2h-1,3,5-thiadiazine-2-thione, tributyltin benzoate, and derivatives thereof.

Examples of the aforementioned biocide reagents are able to be Nuosept® manufactured by Huls America (International Specialty Products™), Proxel® GXL manufactured by Arch UK Biocides (Avecia™), Bioban® and Canguard® manufactured by Angus Chemical Co., Dowicide® and Dowicil® manufactured by Dow Chemical Co., and Ucarcide® manufactured by Union Carbide Corp.

In some embodiments, amines are employed to increase the pH of a coating composition to help dissolving various dyes such as "direct dyes" or various resins such as acrylics. In some embodiments, amines suitable for the ink compositions include, but are not limited to, ethylenediamine, diethylenetriamine, triethylenetetriamine, diethanolamine, triethanolamine, AMP-95 and derivatives thereof.

Still referring to FIG. 1, the engineered surface 106 is able to be prepared by applying the particulate coating 104 on the first surface 102. In some embodiments, the particulate coating 104 is able to be coated on the first surface 102 with the liquid coating comprising aforementioned materials in effective concentration to form the engineered surface 106 with desired properties. The desired properties on the engineered surface 106 are able to be dry and substantially non-tacky surface. In some embodiments, the particulates are able to have good adhesion to each other and the first surface 102 without flaking off. In some embodiments, the liquid coating mentioned above is able to comprise one or more chemicals that are able to be found on the paper of a photo paper or in the coating layer of the photo paper. The photo paper is able to be Epson® photo papers including Epson® Ultra Premium Photo Paper Glossy, Epson® Premium Photo Paper Glossy, Epson® Photo Paper Glossy, Epson® Premium Photo Paper Semi-gloss, and/or Epson® Ultra Premium Photo Paper Luster.

Figure 2:
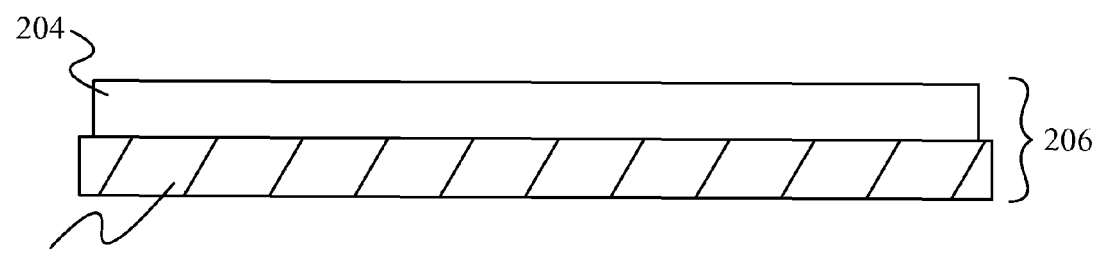
FIG. 2 shows a simplified schematic of a compliant member in accordance with one or more embodiments of the present invention.

FIG. 2 shows a simplified schematic of a compliant member in accordance with one or more embodiments of the present invention. As shown in the example of FIG. 2, a second surface 202 is able to be coupled with a compliant member 204. The second surface 202 is able to be a porous or non-porous surface. Non-limiting examples of porous surfaces include paper, corrugated box, masonry, dry-wall, wood, woven and non-woven substrates. Non-limiting examples of non-porous surfaces are able to be plastic, rubber, metal, and glass.

The compliant member 204 is able to be configured to adhere on the second surface 202 to form a compliant unit 206. The compliant member 204 is able to be an elastomeric material. The elastomeric material is able to be an uncross-linked elastomer, a thermoplastic elastomer, and/or a cross-linked elastomer.

In some embodiments, elastomeric materials suitable to be employed in a composition that is able to be used to form the compliant member 204 include, but are not limited to, natural rubber (NR), polyisoprene (IR), chloroprene rubber (CR), butyl rubber (BR), polybutadiene rubber (BR), nitrile rubber (NBR), styrene-butadiene rubber (SBR), ethylene propylene copolymer (EPDM), silicone rubber, ethylene-vinyl acetate (EVA), chlorosulfonated polyethylene (CSM), polyacrylic rubber (ACM), flourosilicone rubber, flouroelastomer, perfluoroelastomer, polyether block amide (PEBA), chlorosulfonated polyethylene, thermoplastic elastomer, thermoplastic urethane, thermoplastic olefins (TPO) and/or thermoplastic vulcanizates (TPV). A person of ordinary skill in the art would appreciate that any polymeric materials are applicable so long as the polymeric materials have specific/selective adhesive property with the engineered surface. The polymeric materials are able to be polymers, co-polymers, graft polymers, blends, and elastomerics.

In some embodiments, the compliant member 204 is able to be formulated from silicone rubber. The silicone rubber is able to be formulated to produce compliant members 204 with a wide range of physical properties. A physical property of interest is the hardness of the compliant member 204. The hardness of the compliant member 204 is able to be measured using a durometer using the ASTM 2240 type A scale. In contrast to the typical tacky pressure sensitive adhesive, the compliant member 204 formed from the crosslinked silicone rubber formulation is dry and non tacky to touch.

EXAMPLE A

Clear Compliant Member of Silicone

In a non-limiting example, a clear compliant member with a 16 Shore A is prepared using 100 parts Dow Corning 9600 base, 3 parts Dow Corning 9600 catalyst, and 3 parts Dow Corning SL 9106 coating. The components are weighed, mechanically mixed, formed to desired shape, and cured at 120° C. for one minute to produce a clear compliant member with a 16 Shore A hardness.

EXAMPLE B

Filled and or Colored Compliant Member of Silicone

In another non-limiting example, a colored compliant member is prepared using components from Example A. However, the Dow Corning 9600 base concentration needs to be adjusted proportionally to the masterbatch color added. For example, to produce a white compliant member a white masterbatch with 50% TiO2 is able to be added. The white masterbatch is available from Dow Corning LPX Liquid Color Masterbatches. If 24 parts of the white masterbatch is added, the Dow Corning 9600 base needs to be adjusted proportionally to 76 parts. Alternatively or additionally, color masterbatches are employed to produce a wide range of color.

EXAMPLE C

Conductive Compliant Member with Additions

In another non-limiting example, a conductive compliant member is prepared using components from Example A. Conductive materials, such as indium tin oxide, graphene, carbon nanotube, silver, copper, and/or gold nano-particles, are added to example A in effective concentration to produce conductive compliant member. The term "conductive" is able to include thermal, electrical, vibrational, signal, and/or for a purpose of antistatic. Other additives are able to include scents, molecular components, thermal indicators, various nanosensors, and biomaterials. Thin layers are able to be used to prevent outgassing of polymer components.

Silicone rubber is able to be employed to formulate compliant member with a range of physical properties. A catalyst such as platinum is able to be employed to increase curing rate and/or crosslink density of the rubber. Colorants are able to be employed to increase opacity of the compliant member and/or color the compliant member. Furthermore, conductive nano-particles are able to be added to form conductive compliant member. The compliant member formed from the silicone rubber formulation has the desired properties of dry, non-tacky, and compliance.

In some embodiments, the compliant member is able to be formulated from thermoplastic elastomer. The simplest thermoplastic elastomer consists of a rubbery midblock with two plastic polystyrene end-blocks. The thermoplastic elastomers comprises: polystyrene-polybutadiene-polystyrene polymers (S-B-S), polystyrene-polyisoprene-polystyrene polymers (S-I-S), polystyrene-poly(ethylene/butylene)-polystyrene polymers (S-EB-S), and/or polystyrene-poly(ethylene/propylene)-polystyrene polymers (S-EP-S). The thermoplastic elastomer is also able to be formulated to produce compliant members with a wide range of physical properties. The compliant member formed from the thermoplastic elastomer formulation is able to be dry and non-tacky to the touch.

Additives are able to be employed in thermoplastic elastomer formulation to affects end properties, e.g., Shore A. The choice of resin in the thermoplastic elastomer formulation is very important. There are two types of resin employed in thermoplastic elastomer formulation. The first type of resins is able to be mid-block-compatible resins, and the second type of resins is able to be end-block-compatible resins.

Mid-block-compatible resins have relatively low solubility parameters and tend to associate with the rubbery mid-blocks and not with the polystyrene end-blocks. The mid-block-compatible resins comprise: aliphatic olefin-derived resins, rosin esters, polyterpenes, and terpene phenolic resins. The effect of adding mid-block-compatible resin includes increasing the fraction of mid-block phase resulting in softening the compliant member, e.g., lower Shore A value.

End-block-compatible resins have relatively high solubility parameters and tend to associate with the polystyrene end-blocks and not with the rubbery mid-blocks. End-block-compatible resins are able to have softening points above about 85° C. The end-block-compatible resins comprise: polyaromatics, coumarone-indene resins, and other high solubility parameters resins. The effect of adding end-block-compatible resin includes increasing the fraction of end-block phase resulting in stiffening the compliant member, e.g., increase Shore A value.

In some embodiments, plasticizers are able to be employed in thermoplastic elastomer formulation to affect end properties of the compliant member. The desired characteristics of the plasticizers for thermoplastic elastomers include those that are completely insoluble with the end-block phase, completely soluble with the mid-block phase, and low in cost. The suitable plasticizers for thermoplastic elastomer formulation include hydrocarbon oils with solubility parameter slightly lower than the mid-block solubility parameter. The effect of adding plasticizer includes decreasing the hardness and modulus of the compliant member at room temperature, e.g., lower Shore A value.

EXAMPLE D

Thermoplastic Elastomer

In a non-limiting example, a clear compliant member is prepared using S-EB-S thermoplastic elastomer at about 70 parts, resin at about 25 parts, plasticizer at about 5 parts. The components are weighed, mechanically mixed, formed to desired shape to produce a clear compliant member.

Referring back to FIGS. 1 and 2, FIG. 1 shows that the particulate coating 104 is coated on the first surface 102, so that the engineered surface 106 is formed. The engineered surface 106 is able to be a dry and/or non-tacky surface that is smooth in appearance and has no adhesive property, e.g., does not stick to itself or other surfaces. FIG. 2 shows the compliant member 204 formed on the second surface 202 to form a compliant unit 206. The surface of the compliant member 204 is able to be dry, non-tacky and has no adhesive property.

In some embodiments, the engineered surface 106 and the compliant unit 206 form an adhesive bond, in an unexpected and non-obvious manner, when the particulate coating 104 and the compliant member 204 are brought into physical contact. Since the surfaces of the engineered surface 106 and the compliant unit 206 are dry and non-tacky without adhesive property, the adhesion of the two surfaces to each other when in physical contact is an unexpected result.

The inventors herein believe that the adhesion mechanism is able to result from the formation of an adhesive mechanism between the compliant member 204 and the microscopic nano-pores that are formed on the engineered surface 106. The engineered surface 106 is formed by applying a coating substance containing nano-particles on the first surface 102. The nano-particles on the engineered surface 106 are separated by nano-pores due to imperfect packing. When the compliant member 204 comes into physical contact with the engineered surface 106, the compliant member 204 is able to deform and fill in the nano-pores forming a mechanical interlocking adhesion mechanism. Furthermore, depending on the functional groups available, the adhesion from the mechanical interlocking is able to be and/or to be enhanced by hydrogen bonding and/or van der Waals force. The above mentioned functioning principle is described as one of the functioning principles and other functioning principles are also applicable.

Figure 3:
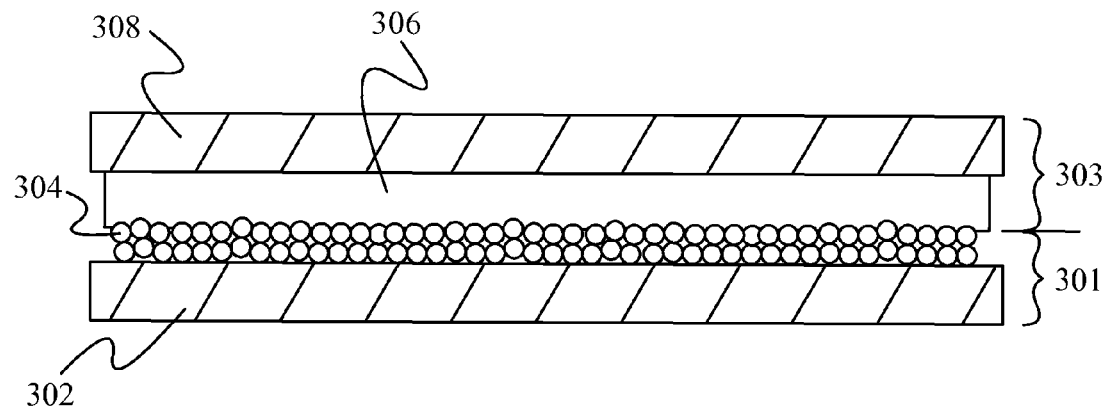
FIG. 3 shows a simplified schematic of the adhesion formed between a compliant member and a particulate coating in accordance with one or more embodiments of the present invention.

FIG. 3 shows a simplified schematic of the adhesion formed between a compliant member 306 and a particulate coating 304 in accordance with one or more embodiments of the present invention. As shown in the example of FIG. 3, an engineered surface 301 comprises of first surface 302 which is able to be coated with the particulate coating 304 to form the engineered surface 301. A compliant unit 303 comprises a second surface 308 which is able to be attached to the compliant member 306. The engineered surface 301 with particulate coating 304 is in physical contact with compliant member 306 to form a novel adhesive bond to adhere the first surface 302 to the second surface 308.

TABLE I

| Sample | Shore A Hardness | | Adhesion |
|---|---|---|---|
| | 1 day | 3 days | |
| P-10 | 12 | 4 | Yes |
| P-20 | 21 | 22 | Yes |
| P-90 | 32 | 35 | Yes |
| P-44 | 42 | 42 | No |
| P-45 | 44 | 45 | No |
| P-50 | 52 | 54 | No |
| P-60 | 58 | 62 | No |
| P-70 | 58 | 60 | No |

Table I shows adhesion testing data of silicone rubber strips of various Shore A hardness to the engineered surface. A set of silicone rubber strips is cured with a platinum catalyst resulting in compliant members of various Shore A hardness. The above mentioned materials are able to be obtained from Silicones, Inc. The first column shows the product number, the second and third columns show the Shore A hardness value of the compliant members, and the fourth column indicates whether the compliant member adheres to the engineered surface. The adhesion test is performed by bringing the compliant member into physical contact with the engineered surface. The adhesion is a pass/fail test to determine if the compliant member adheres to the engineered surface.

TABLE II

| Sample | Shore A Hardness | | Adhesion |
|---|---|---|---|
| | 1 day | 7 days | |
| GI-1110 | 5 | 10 | Yes |
| GI-1120 | 28 | 32 | Yes |
| GI-1000 | 28 | 32 | Yes |
| GI-1040 | 30 | 42 | Yes |
| GI-311 | 42 | 44 | No |
| GI-360 | 60 | 64 | No |
| GI-380 | 68 | 74 | No |

Table II shows adhesion testing data of silicone rubber strips of various Shore A hardness to the engineered surface. A set of silicone rubber strips is cured with a tin catalyst resulting in compliant members of various Shore A hardness. The above mentioned materials are able to be obtained from Silicones, Inc.

For both platinum and/or tin catalyzed silicone rubber strips of various Shore A hardness, the data indicates that the lower Shore A compliant member shows an adhesive property to the engineered surface. For a Shore A Hardness value greater than 42, silicone rubber strips does not show an adhesive property to the engineered surface.

TABLE III

| Samples | Shore A Hardness | Adhesion |
|---|---|---|
| GI-1110 | 37 | Yes |
| GI-1120 | 55 | Yes |

Table III shows adhesion testing data of polyurethane strips of various Shore A hardness to the engineered surface. A set of polyurethane rubber strips are able to be obtained from Innovative Polymer, Inc. The data indicates that even for a high Shore A hardness value of 55, greater than 42 for silicone rubber, the polyurethane strips still show adhesion to the engineered surface. Thus the data indicates that different polymers are able to have different Shore A threshold value and still show adhesion to the engineered surface.

Figure 4:
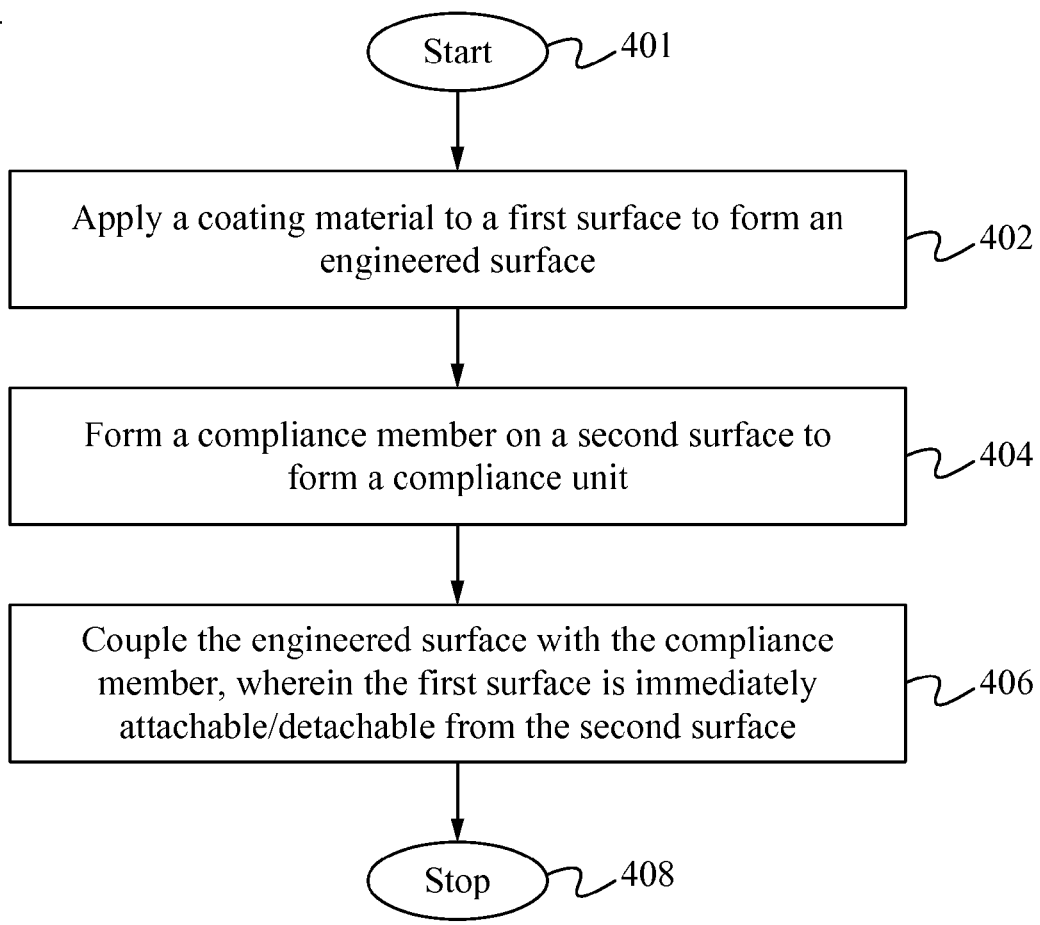
FIG. 4 is a flow chart illustrating a method of forming and using a selective adhesive mechanism in accordance with one or more embodiments of the present invention.

FIG. 4 is a flow chart illustrating a method 400 of forming and using a selective adhesive mechanism in accordance with some embodiments of the present invention. The method 400 is able to start from Step 401. At Step 402, a coating material is applied to a first surface to form an engineered surface. The coating material is able to be the particulate liquid coating, or a coating using any chemicals described above. The first surface is able to be the first surface 102 (FIG. 1) or any other surfaces, such as wall, paper, medical/surgical devices, hygienic materials, kitchen/dining wares, tools, office supplies, gardening tools, clothing, food and its related containers, automobiles or moving vehicles, educational supplies, entertainment devices, electronic devices, solar panels, integrated circuits (ICs), gadgets for pets, toys, and nanoparticles. The hygienic materials are able to be the surface of a diaper or diaper tab. At Step 404, a compliant member is formed on a second surface to form a compliant unit. The compliant member is able to be the compliant member 204 (FIG. 2) or any other compliant members, such as a polymeric material having a polymer with pre-selected hardness. The second surface is able to be the same or different surface from the first surface described above. At Step 406, the engineered surface is coupled with the compliant member, wherein the first surface is able to be instantly attachable/detachable from the second surface. The method 400 is able to stop at Step 408.

Figure 5:
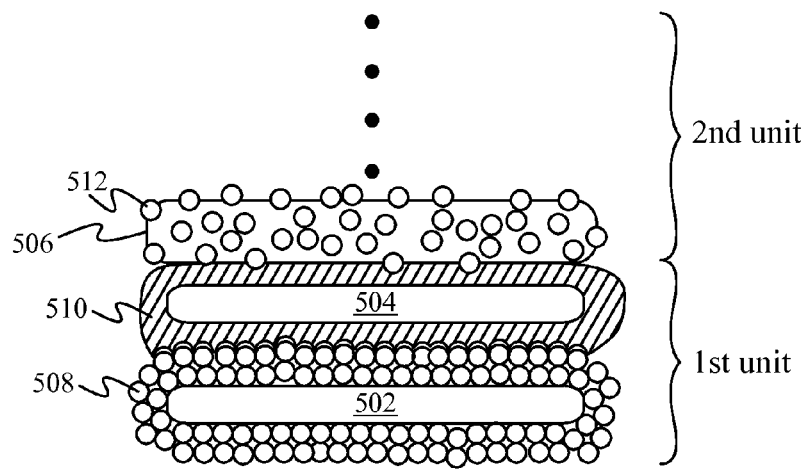
FIG. 5 shows a sandwiched building block of the surface specific polymeric dry adhesive in accordance with one or more embodiments of the present invention.

FIG. 5 shows a sandwiched building block 500 in accordance with some embodiments of the present invention. The sandwiched building block 500 is able to contain a block 502 and a block 504 forming a first unit of the building block 500. The block 502 is able to contain an engineered surface 508 and the block 504 is able to contain a compliant member 510, so that the engineered surface 508 is adhesive to the compliant member 510 selectively. A block 506 having an engineered surface 512 is able to be coupled to the block 504 by forming selective adhesion between the engineered surface 512 and the compliant member 510. By adding block 506 to the first unit, the building block is able to continue to add on a second unit. Accordingly, the building block 500 is able to grow and extend infinitely. A person of ordinary skill in the art would appreciate that any numbers of the building blocks are applicable.

Figure 6:
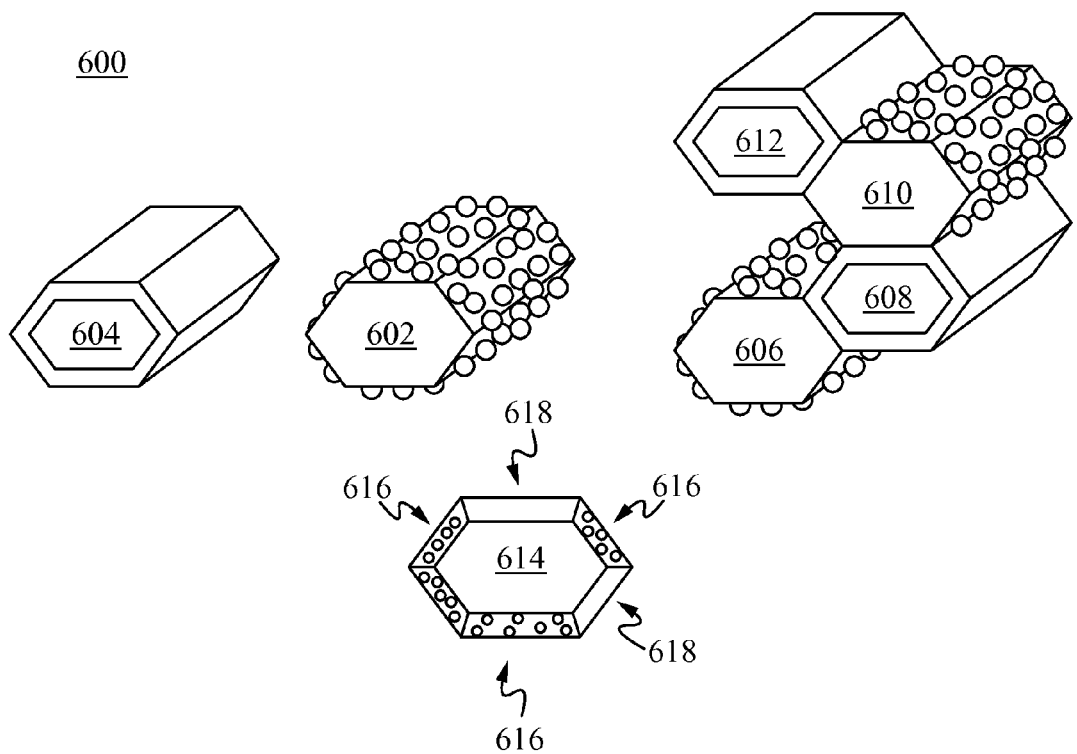
FIG. 6 shows uses of the surface specific polymeric dry adhesive in accordance with one or more embodiments of the present invention.

FIG. 6 shows uses of the surface specific polymeric dry adhesive 600 in accordance with some embodiments of the present invention. Similar to the building block 500 described above, the surface specific polymeric dry adhesive 600 is able to contain blocks 602 and 604. The block 602 is able to contain an engineered surface and the block 604 is able to contain a compliant member 604. The selective adhesion between the engineered surface of the block 602 and the compliant member 604 of the block 604 allows the blocks to be stacked up. For example, the block 606 with an engineered surface is able to attach to a side the block 608 with compliant member. Similarly, the block 610 with an engineered surface is able to be attached to the block 608. The block 612 with a compliant member 612 is able to attach to the block 610. The surface specific polymeric dry adhesive 600 is able to be molded/manufactured in any shape in 3D, applied to a 2D surface, or to be blended into the row material for making a product. Further, the surface specific polymeric dry adhesive 600 is able to be made with conductive materials, so that the building of the blocks 606 to 612 forms an electrical/thermal/signal/vibrational/signal conducting pathway from the block 606 to the block 612. Furthermore, the surface specific polymeric dry adhesive 600 is able to comprise elastic/flexible materials, so that the blocks 606 to 612 are able to form a shock wave absorbing/reducing material and/or insulator. Moreover, the surface specific polymeric dry adhesive 600 is able to form a water-tight/seal device. The blocks 602-612 are described as some of the examples, a block 614 is able to have both the engineered surfaces 616 and compliant members 618 at any locations and/or zones.

FIG. 7 shows more uses of the surface specific polymeric dry adhesive 700 in accordance with some embodiments of the present invention. In some embodiments, the uses are able to comprise a polymeric unit 710 and a surface 701. The surface 701 is able to contain the engineered surface as describe above forming a "smart surface," "intelligent surface," "intelligent material," and/or "technical surface" with adjustable properties, such as adjustable adhesion by using the sprayable form of the coating substances for the engineered surface. In some embodiments, the surface 701 is able to contain a coated surface 702 using the coating substance/chemicals for the engineered surface described above. In other embodiments, the surface 701 is able to contain a material 704 blended with the substances for making the engineered surface described above. Accordingly, the substances for making the engineered surface and other materials are able to be blended/mixed thoroughly for making the material 704. In some other embodiments, the substances for making the engineered surface are made into a sprayable form contained in a spraying container 708, such as a pressurized canister with or without solvents. By having the sprayable form of the substances, the surface 701 is able to have a region 706 having the spray-on coating forming the engineered surface. In some embodiments, the surface 701 is able to contain different regions, such as the regions 702, 704, and 706, containing different properties, such as different density of the coating materials of the engineered surface or different graphic patterns. Additionally, the surface 701 is able to be treated with various other processes. For example, chemical processes are able to be used to selectively vary the Shore A hardness on the one or more of the regions 702-704 to create bonding or non-bonding areas. Further, plasma treatments are able to be applied to the surface 701. In some embodiments, a tool 712, such as a scissor, is able to be wrapped/coated with a layer of the polymeric unit 710, such that the tool 712 is able to adhere to the surface 701.

FIG. 8 shows more uses of the surface specific polymeric dry adhesive 800 in accordance with some embodiments of the present invention. The surface specific polymeric dry adhesive 800 is able to have various uses, including textile/clothing related applications, hair treatments, skin treatments, and making flexible electronics.

In some embodiments, a bra 810 comprises an engineered surface 812 in the inside cone of the bra, such that a breast pad 814 is able to be adhered and/or immobilized to the engineered surface 812. A person of ordinary skill in the art would appreciate that the breast pad 814 is able to be made of silicone or any other polymers. In other embodiments, the bra 810 comprises a first strip with an engineered surface 818 and a second strip with a polymeric unit 820, such that the bra 810 is able to be worn by attaching the engineered surface 818 with the polymeric unit 820.

In some other embodiments, the substances/chemicals for making the coating of the engineered surface are made into a sprayable form. The substances are able to be non-toxic substances, such that the substances are able to be applied on human body or animals. The substances are also able to be PVP (polyvinyl pyrrolidone) resin or any other chemicals that are able to be used in hair products, such as gel and hairspray. The sprayable form of the substances is able to be contained in a container 804. A user 802 is able to spray the substances on his/her skin 803. A dress 806 having the surface specific polymeric dry adhesive 808 is able to adhere to the skin 803 preventing the dress 806 from slipping downward. The user 802 is also able to spray the substance on his/her hair 805, such that a polymeric band 816 is able to adhere to the hair 805 for making a desired hairstyle. Similarly, the surface specific polymeric dry adhesive 800 is able to be used in many other objects using the components described above, such as jewelry, earrings, first-aid band aids, toupees, and false eyelashes.

Further, the surface specific polymeric dry adhesive 800 is able to be used in electronics, such as flexible electronics and printed circuit boards. In some examples, a polymeric unit, such as polyimide and PEEK (polyether ether ketone), is able to be used to adhere to conductor materials, such as copper wires, by applying the substances/chemicals for making the coating of the engineered surface. The substances mentioned above are able to replace/add on the typical bonding chemicals.

In a non-limiting example, the particulate coating is able to be applied onto a clean dry wall surface, a surface having primer thereon or a surface having paint thereon, of buildings to form an engineered surface. The wall that contains an engineered surface allows various articles attached to the compliance member to be adhered onto the wall.

In another non-limiting example, a shoe lace is able to be coated with the compliant member on one side of the lace and coated with the engineered surface on the other side of the lace. The shoe lace is able to be employed as a simple twist-tie to allow individuals without dexterity to adhere the end of the shoe lace together as simple twist-tie. Thus, the shoe lace is able to have both engineered surface and compliant member. In another non-limiting example, the material for making the engineered surface is used as a raw material or blended with other materials, such as plastics or gels, to make a substance containing the material for making the engineered surface. For example, the material for making the engineered surface is blended with pulp or cellulose to produce a sheet of paper. As a result, a portion or whole sheet of the paper is able to be selectively adhesive to an object that contains the compliant member or silicon rubber.

Figure 9:
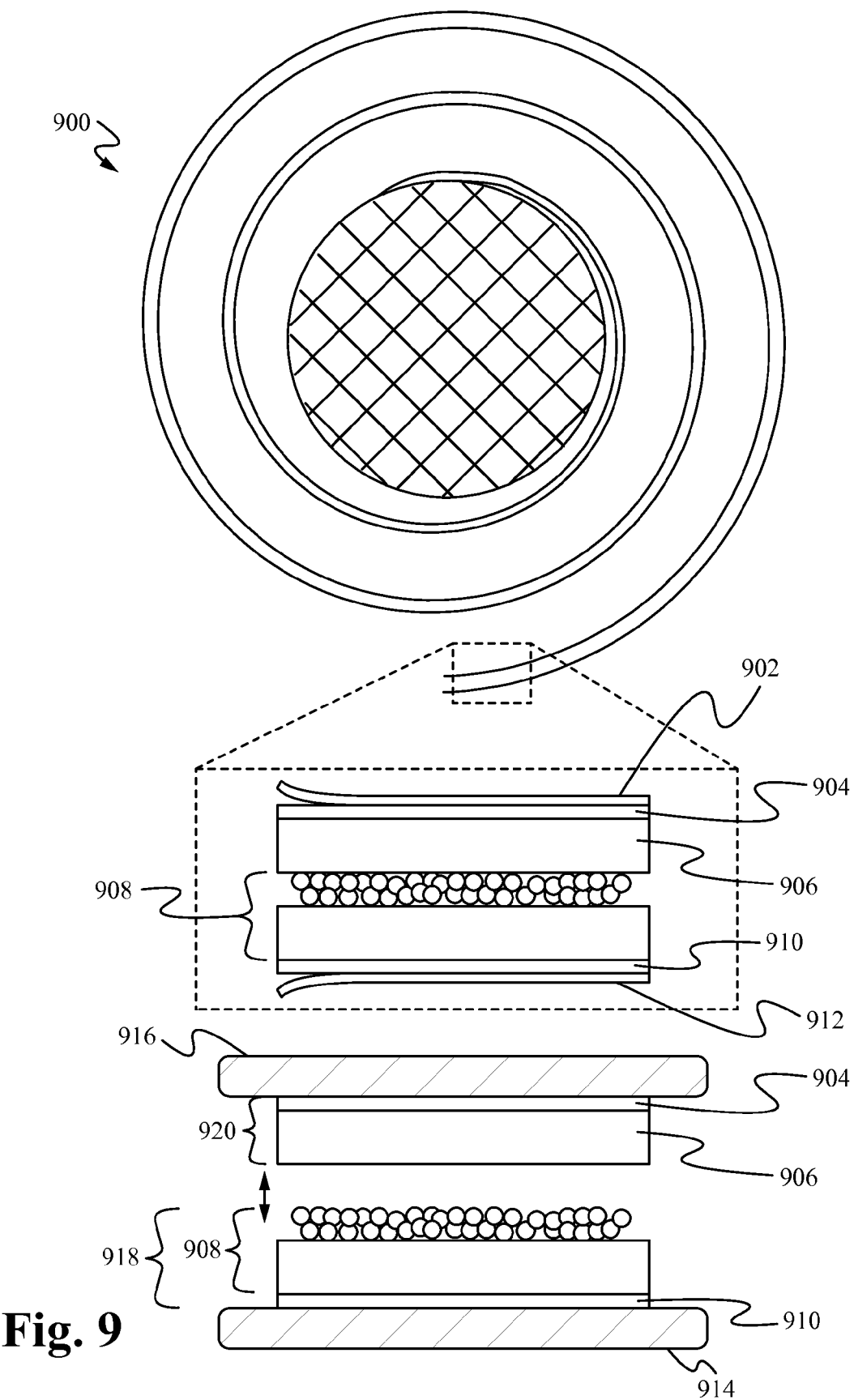
FIG. 9 shows a tape structure using the surface specific polymeric dry adhesive in accordance with some embodiments of the present invention.

FIG. 9 shows a tape structure 900 using the surface specific polymeric dry adhesive in accordance with some embodiments of the present invention. The tape structure 900 is able to be rolled up as a tape roll. In some embodiments, the tape structure 900 comprises release liners 902 and 912, pressure sensitive adhesives 904 and 910, a compliance member 906, and an engineered surface 908. The release liner 902 is able to cover the surface of the compliance member 906 having pressure sensitive adhesive 904 in between the release liner 902 and the compliance member 906. Similarly, the engineered surface 908 is able to be covered by the release liner 912 having the pressure sensitive adhesive 910 in between the release liner 912 and the engineered surface 908. The release liners 902 and 912 are able to be peeled off allowing the pressure sensitive adhesives 904 and 910 attach/glue to substrates 914 and 916. It should be apparent to those skilled in the art that the tape could also comprise a release coating instead of a release liner. The substrates 914 and 916 are able to be any substances, such as hand tools. By applying a part 918 (including pressure sensitive adhesive 910 and engineered surface 908) to the substrate 914 and a part 920 (including pressure sensitive adhesive 904 and the compliance member 906) to the substrate 916, the substrates 914 and 916 are able to be instantly attachable to/detachable from each other. A person of ordinary skill in the art will appreciate that any number of layers are applicable.

To utilize the adhesive mechanism, a user brings the compliant member into physical contact with the engineered surface, so that the object containing the compliant member is able to instantly attach to the object that contains the engineered surface. To detach the compliant member from the engineered surface, the user is able to separate the compliant member with the engineered surface by a force.

In operation, the compliant member is able to be repeatedly attached to and detached from the engineered surface without substantial damages to the compliant member and the engineered surface.

The present invention has been described in terms of specific embodiments incorporating details to facilitate the understanding of principles of construction and operation of the invention. Such reference herein to specific embodiments and details thereof is not intended to limit the scope of the invention. It will be readily apparent to one skilled in the art that other various modifications may be made in the embodiment chosen for illustration without departing from the spirit and scope of the invention.

What is claimed is:

1. A reversible adhesive mechanism comprising:
   a) a first member having a spray-coated engineered non-tacky surface, wherein the spray-coated engineered non-tacky surface comprises nanopores formed by imperfect packing of sprayed nanoparticles; and
   b) a second member comprising a non-tacky compliant member, wherein the non-tacky compliant member deforms to fill in the nanopores forming a selective adhesivity toward the engineered non-tacky surface when the non-tacky compliant member is in physical contact with the spray-coated engineered non-tacky surface.

2. The adhesive mechanism of claim 1, wherein the non-tacky compliant member forms an adhesive bond with the spray-coated engineered non-tacky surface when the non-tacky compliant member and the spray-coated engineered non-tacky surface are brought into physical contact.

3. The adhesive mechanism of claim 2, wherein the non-tacky compliant member comprises a polymeric material.

4. The adhesive mechanism of claim 3, wherein the polymeric material comprises a silicone polymer.

5. The adhesive mechanism of claim 4, wherein the silicone polymer comprises a silicone gel or silicone rubber.

6. The adhesive mechanism of claim 3, wherein the polymeric material comprises a silicon based polymer.

7. The adhesive mechanism of claim 2, wherein the non-tacky compliant member comprises a thermoplastic elastomer.

8. The adhesive mechanism of claim 3, wherein the polymeric material has selective adhesion to the spray-coated engineered non-tacky surface when a hardness of the polymeric material is within a preselected range of Shore A scale of a durometer.

9. The adhesive mechanism of claim 8, wherein the range is lower than 55 Shore A hardness when the polymeric material comprises polyurethane.

10. The adhesive mechanism of claim 8, wherein the range is lower than 42 Shore A hardness when the polymeric material comprises silicone rubber.

11. The adhesive mechanism of claim 3, wherein the polymeric material comprises polyurethane.

12. A set of reversible adhesive material comprising:
    a) a first surface comprising a non-tacky polymeric material; and
    b) a second spray-coated non-tacky surface containing nanopores formed by imperfect packing of sprayed nanoparticles, wherein the second non-tacky surface is selectively adhesive to the non-tacky polymeric material by deforming the non-tacky polymeric material to fill in the nanopores when the second non-tacky surface is in contact with the first surface.

13. The adhesive material of claim 12, wherein the non-tacky polymeric material is molded to attach with a device or enclose the device.

14. The adhesive material of claim 13, wherein the device comprises one or more of a hand tool, electronic device, equipment, office supply, kitchen ware, or a combination thereof.

15. The adhesive material of claim 12, wherein the second non-tacky surface comprises one or more of a wall, paper, medical device, electronic device, or a combination thereof.

16. The adhesive mechanism of claim 12, wherein the non-tacky polymeric material has selective adhesion to the non-tacky second surface when a hardness of the non-tacky polymeric material is within a preselected range of Shore A scale of a durometer.

17. The adhesive mechanism of claim 16, wherein the range is lower than 55 Shore A hardness when the non-tacky polymeric material comprises polyurethane.

18. The adhesive mechanism of claim 16, wherein the range is lower than 42 Shore A hardness when the polymeric material comprises silicone rubber.

19. The adhesive mechanism of claim 12, wherein the non-tacky polymeric material comprises polyurethane.

20. A fastening device comprising a first surface containing a non-tacky polymeric material and a second non-tacky surface containing a spray-coated engineered non-tacky surface, wherein the fastening device is able to fasten an object when the first surface is in physical contact with the second non-tacky surface, wherein the fastening results from selective adhesion due to the non-tacky polymeric material deforming to fill in nanopores on the spray-coated engineered non-tacky surface, wherein the selective adhesion is reversible and the nanopores are formed by imperfect packing of sprayed nanoparticles.

21. The fastening device of claim 20, wherein the fastening device comprises a twist tie.

22. The adhesive mechanism of claim 20, wherein the non-tacky polymeric material has selective adhesion to the spray-coated engineered non-tacky surface when the non-tacky polymeric material is in contact with the spray-coated engineered non-tacky surface and when a hardness of the non-tacky polymeric material is within a preselected range of Shore A scale of a durometer.

23. The adhesive mechanism of claim 22, wherein the range is lower than 55 Shore A hardness when the non-tacky polymeric material comprises polyurethane.

24. The adhesive mechanism of claim 22, wherein the range is lower than 42 Shore A hardness when the polymeric material comprises silicone rubber.

25. A reversible adhesive mechanism comprising:
    a) a first member having a spray-coated non-tacky engineered surface, wherein the spray-coated non-tacky engineered surface comprises fumed silica or fumed alumina nanoparticles and pores, wherein the pores contain nanopores formed by imperfect packing of sprayed fumed silica nanoparticles or sprayed fumed nanoparticles; and b) a second member comprising a non-tacky compliant member to be selectively adhered to the spray-coated non-tacky engineered surface by deforming the non-tacky compliant member to fill in the nanopores, wherein the non-tacky compliant member comprises a polymeric material and forms an adhesive bond with the spray-coated non-tacky engineered surface when the non-tacky compliant member and the spray-coated non-tacky engineered surface are brought into physical contact, further wherein the polymeric material comprises polyurethane and is selectively adhered to the spray-coated non-tacky engineered surface when a hardness of the polymeric material is within a preselected range of Shore A scale of a durometer.

26. The adhesive mechanism of claim 25, wherein the range is lower than 55 Shore A hardness.

* * * * *